United States Patent [19]
Lawther

[11] Patent Number: 5,528,326
[45] Date of Patent: Jun. 18, 1996

[54] SINGLE-USE CAMERA WITH LIGHT-BLOCKING FILM-PROTECTIVE END STRIP

[75] Inventor: Joel S. Lawther, Rochester, N.Y.

[73] Assignee: Eastman Kodak Company, Rochester, N.Y.

[21] Appl. No.: 368,569

[22] Filed: Jan. 3, 1995

[51] Int. Cl.$^6$ .................................................. G03B 1/00
[52] U.S. Cl. ........................ 354/212; 354/275; 354/288; 242/348
[58] Field of Search .................... 354/212, 213, 354/214, 215, 275, 277, 288; 242/348

[56] References Cited

U.S. PATENT DOCUMENTS

| | | | |
|---|---|---|---|
| 1,454,812 | 5/1923 | Jones | 430/501 |
| 1,454,814 | 5/1923 | Jones | 430/501 |
| 1,454,815 | 5/1923 | Jones | 430/501 |
| 1,454,816 | 5/1923 | Jones | 430/501 |
| 1,605,841 | 11/1926 | Jones | 430/501 |
| 1,900,879 | 3/1933 | Jones | 430/501 |
| 3,647,465 | 3/1972 | Shamay | 96/78 |
| 4,303,325 | 12/1981 | Seely | 354/212 |
| 4,455,076 | 6/1984 | Birkeland | 354/275 |
| 4,505,387 | 3/1985 | Seto | 206/14 |
| 4,733,777 | 3/1988 | Van Geyte et al. | 206/316 |
| 4,911,299 | 3/1990 | Peeters | 206/410 |
| 4,956,658 | 9/1990 | Smart | 354/212 |
| 4,987,047 | 1/1991 | Yui et al. | 430/138 |
| 5,049,928 | 9/1991 | Tirone | 355/72 |
| 5,133,171 | 7/1992 | Chase et al. | 53/409 |
| 5,222,601 | 6/1993 | Takahashi et al. | 206/416 |
| 5,255,040 | 10/1993 | Pugano | 354/275 |
| 5,472,089 | 12/1995 | Specoyna et al. | 206/413 |

*Primary Examiner*—Michael L. Gellner
*Assistant Examiner*—Matthew Miller
*Attorney, Agent, or Firm*—Roger A. Fields

[57] ABSTRACT

A single-use camera comprises a supply spool having a pair of axially spaced flanges, a take-up spool having a pair of axially spaced flanges, and a filmstrip adapted to be wound off the supply spool from between its flanges and onto the take-up spool between its flanges. According to the invention, the filmstrip includes a wider, opaque, trailing end strip. The flanges of the supply spool are spaced from each other more than the width of the trailing end strip to permit the trailing end strip to be stored on the supply spool beneath the filmstrip without being deformed by the flanges. The flanges of the take-up spool are spaced from each other more than the width of the filmstrip but less than the width of the trailing end strip to crimp the trailing end strip to light tightly shield the filmstrip when the trailing end strip is wound onto the take-up spool over the filmstrip. Thus, the need for a film cassette in the single-use camera is eliminated.

2 Claims, 4 Drawing Sheets

SINGLE-USE CAMERA WITH LIGHT-BLOCKING FILM-PROTECTIVE END STRIP

FIELD OF THE INVENTION

The invention relates generally to the field of photography, and in particular to single-use cameras. More specifically, the invention relates to a single-use camera with a light-blocking film-protective end strip for an exposed filmstrip.

BACKGROUND OF THE INVENTION

Film and cameras that are all in one, commonly referred to as single-use cameras, have recently become well known. Typically, the single-use camera is a simple point-and-shoot type comprising a plastic, inner, main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder enclosure or tunnel having front and rear viewfinder lenses, and possibly an electronic flash unit. Plastic front and rear casing or cover portions house the main body portion between them to form a light-tight camera unit. A decorative cardboard outer box contains the camera unit and has respective openings for the taking lens, the shutter release button, the film advance thumbwheel, the viewfinder lenses, the frame counter, and a flash emission window.

At the manufacturer, the main body portion is loaded with a 12, 24, or 36 exposure 35 mm film cassette, and the front and rear casing portions are connected to each other and/or to the main body portion to assemble a light-tight camera unit. Then, an exposed end of a supply spool in the main body portion is rotated to factory prewind substantially the entire length of the unexposed filmstrip from the original-film cassette onto the supply spool. Lastly, the outer box is placed on the camera unit.

After the photographer takes a picture using the single-use camera, he or she manually rotates the thumbwheel in engagement with a take-up spool inside the cassette in order to rewind the exposed frame into the cassette. The rewinding movement of the filmstrip the equivalent of slightly more than one frame width rotates a metering sprocket in engagement with the filmstrip to decrement the frame counter to its next lower-numbered setting. When the maximum number of exposures available on the filmstrip are exposed and the filmstrip is completely rewound into the cassette, the single-use camera is given to a photofinisher who tears the outer box off the camera unit, separates the rear cover portion from the main body portion, and removes the cassette with the filmstrip from the main body portion. Then, he removes the filmstrip from the cassette to develop the negatives and make prints for the customer, and he forwards the used camera parts to the manufacturer for recycling, i.e. remanufacture.

During recycling, the main body portion is re-loaded with a fresh-film cassette, and the front and rear casing portions are re-connected to each other and/or to the main body portion. Then, the exposed end of the supply spool in the main body portion is again rotated to factory prewind substantially the entire length of the unexposed filmstrip from the cassette onto the supply spool. Lastly, a new outer box is placed on the camera unit.

Replacing the original-film cassette with a fresh-film cassette each time the single-use camera is recycled is costly because of the need for the cassette.

SUMMARY OF THE INVENTION

A single-use camera comprising a supply spool having a pair of axially spaced flanges, a take-up spool having a pair of axially spaced flanges, and a filmstrip adapted to be wound off the supply spool from between its flanges and onto the take-up spool between its flanges, is characterized in that:

the filmstrip includes a wider, opaque, trailing end strip (which may be integrally formed with the filmstrip or may be connected to the filmstrip);

the flanges of the supply spool are spaced from each other more than the width of the trailing end strip to permit the trailing end strip to be stored on the supply spool beneath the filmstrip without being deformed by the flanges; and the flanges of the take-up spool are spaced from each other more than the width of the filmstrip but less than the width of the trailing end strip to crimp the trailing end strip to light tightly shield the filmstrip when the trailing end strip is wound onto the take-up spool over the filmstrip. Thus. the need for a film cassette in the single-use camera is eliminated.

DETAILED DESCRIPTION OF THE INVENTION

The invention is disclosed as being embodied preferably in a single-use 35 mm camera. Because the features of a single-use 35 mm camera are generally known as shown for example in prior art U.S. Pat. No. 5,181,057, issued Jan. 19, 1993, the description which follows is directed in particular only to those elements forming part of or cooperating directly with the disclosed embodiment. It is to be understood, however, that other elements may take various forms known to a person of ordinary skill in the art.

Figure 1:
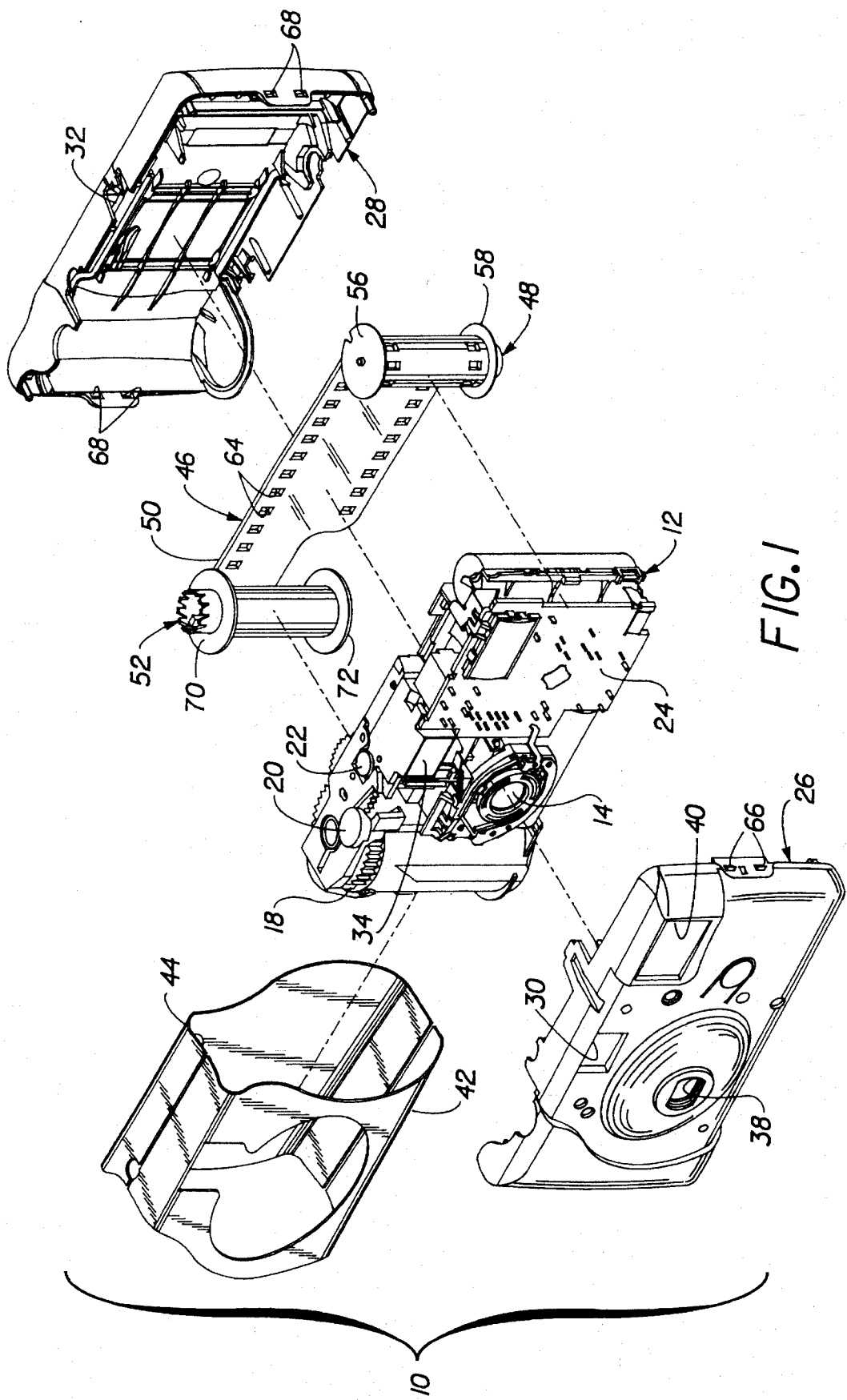
FIG. 1 is a front exploded perspective view of a single-use camera according to a preferred embodiment of the invention, showing an unexposed filmstrip stored on a supply spool and having a film leader attached to a take-up spool for taking up each exposed frame of the filmstrip.
Figure 2:
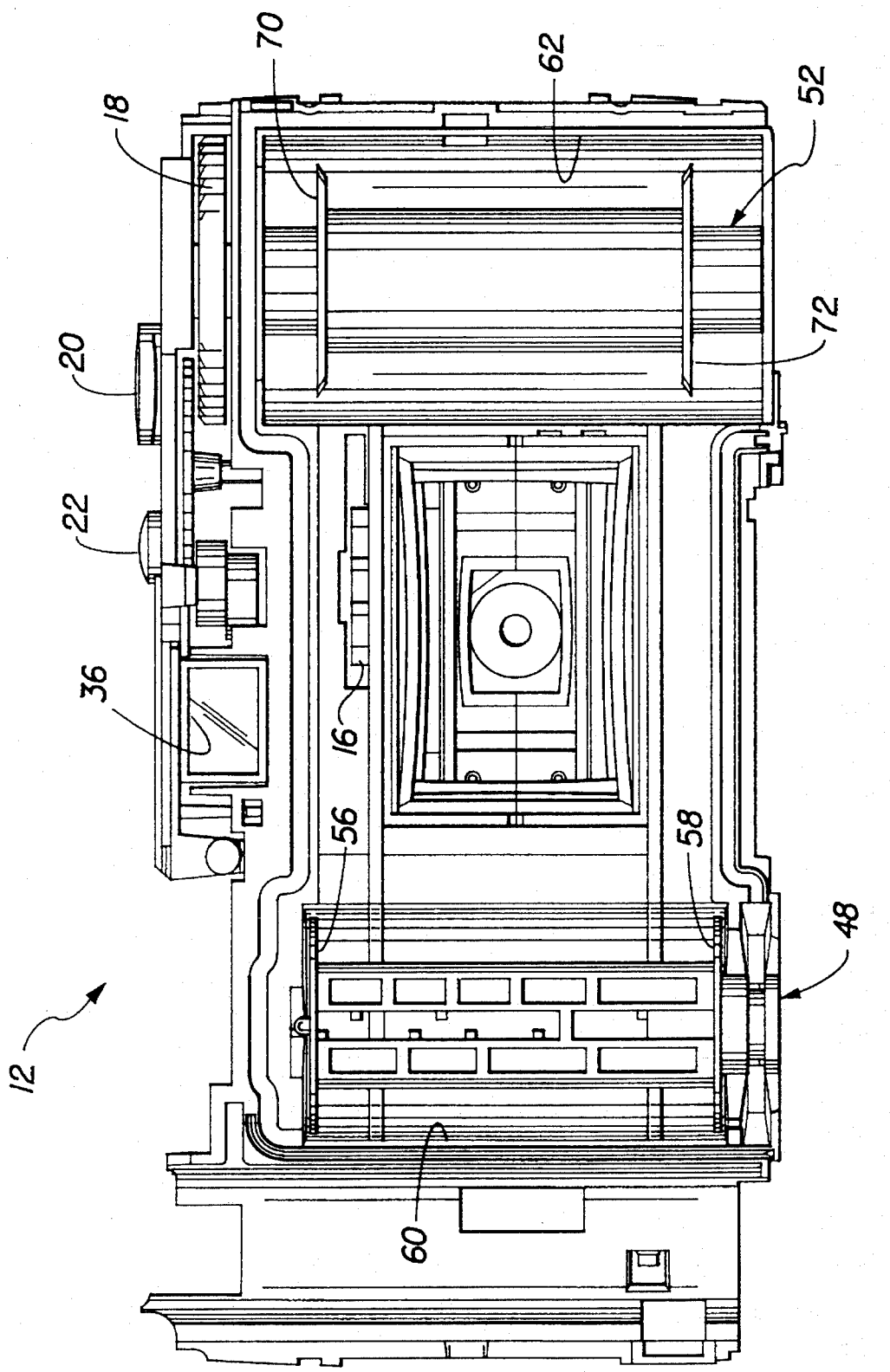
FIG. 2 is rear elevation view of a main body part of the single-use camera including the supply and take-up spools shown empty.

Referring now to the drawings, FIGS. 1 and 2 depict a single-use 35 mm camera 10 which is a simple point-and-shoot type comprising a plastic, inner, main body part or frame 12 which supports a number of typical camera components, for example, a fixed-focus taking lens 14, a film metering mechanism including a metering sprocket 16, a manual film advance thumbwheel 18, a single-blade shutter, not shown, a manual shutter release button 20, a frame counter 22 for indicating the number of exposures remaining for picture-taking, and an electronic flash unit 24. Plastic front and rear casing or cover parts 26 and 28 house the main body part 12 between them to form a light-tight camera unit. The front and rear cover parts 26 and 28 have front and rear viewfinder windows 30 and 32 for front and rear viewfinder lenses 34 and 36 of a viewfinder enclosure or tunnel, not shown, and the front cover part has a lens opening 38 and a flash emission opening 40. Front and rear decorative labels 42 and 44 cover central portions of the front and rear cover parts 26 and 28.

Figure 3:
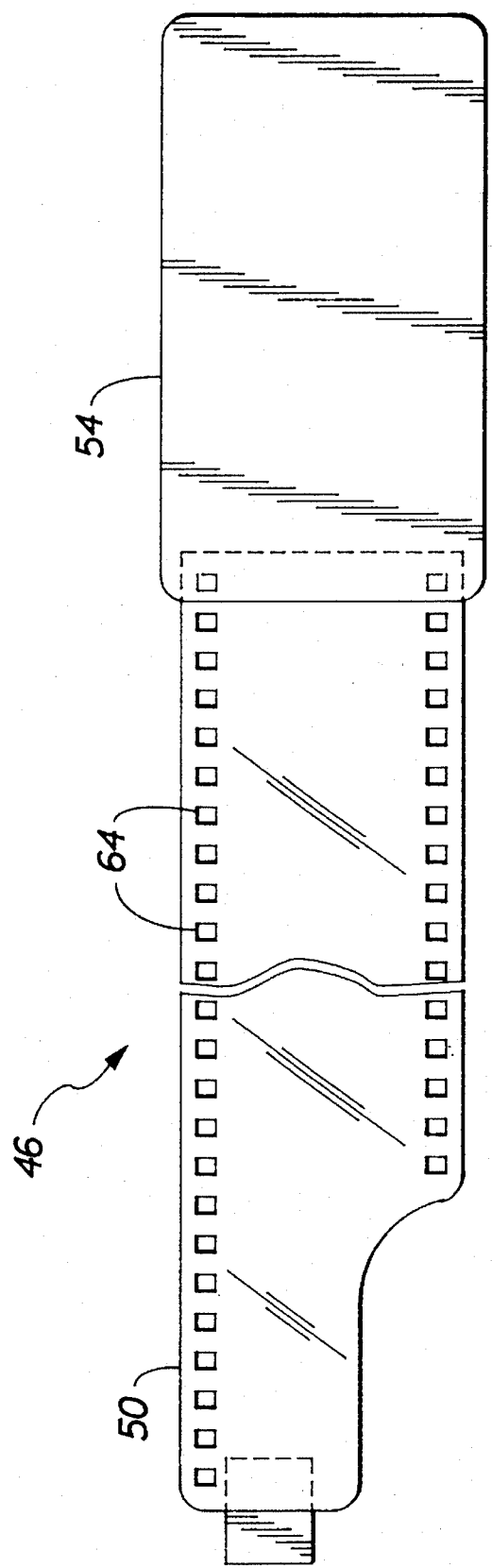
FIG. 3 is an elevation view of the filmstrip including its film leader and a wider, opaque, trailing end strip.
Figure 4:
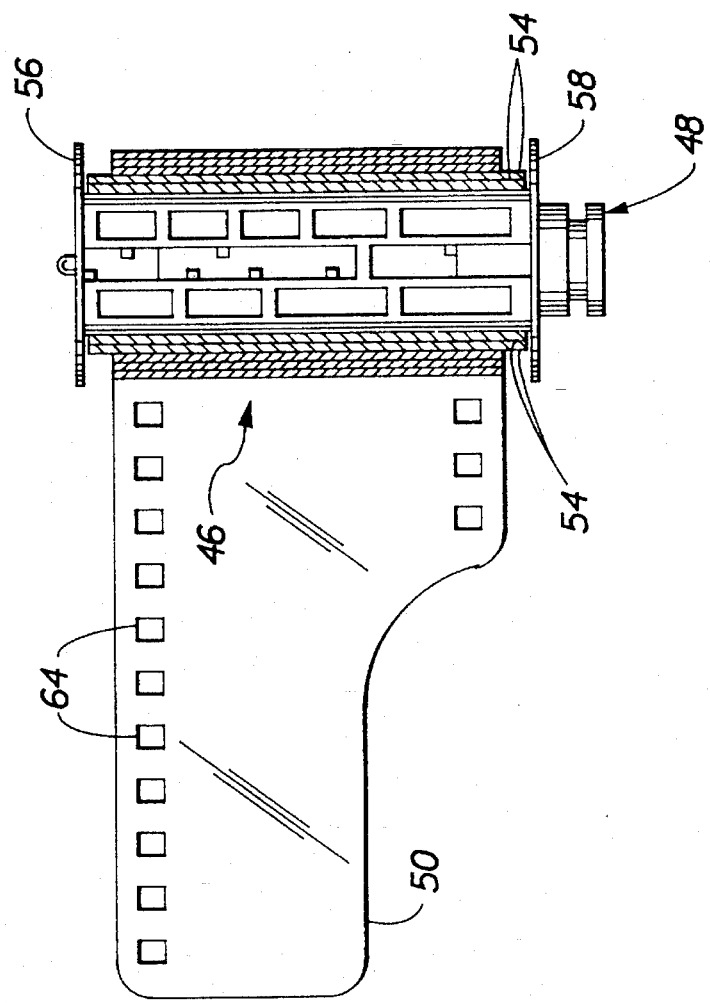
FIG. 4 is a section view of the supply spool with the trailing end strip stored beneath the unexposed filmstrip.

The single-use camera 10 is intended to be used with an unexposed filmstrip 46 stored on a supply spool 48 and having a film leader 50 attached to a take-up spool 52 for taking up each exposed frame of the filmstrip. See FIGS. 1, 3 and 4. The unexposed filmstrip 46 includes a wider, opaque, trailing end strip 54 which is stored on the supply spool 48 beneath the unexposed filmstrip. Preferably, the trailing end strip is a black paper strip attached to the filmstrip. A pair of flanges 56 and 58 of the supply spool 48 are spaced from each other more than the width of the trailing end strip 54 to avoid deforming the trailing end strip.

At the manufacturer, the supply spool 48 with the unexposed filmstrip 46 and the take-up spool 52 with the attached leader 50 are placed in respective supply and take-up chambers 60 and 62 in the main body part 12. Several of the successive film perforations 64 in the film leader 50 and the metering sprocket 16 are mutually engaged. The supply and take-up spools 48 and 52 are rotatably supported in the supply and take-up chambers 60 and 62, and the take-up spool is rotatably coupled to the manual film advance thumbwheel 18 as shown in FIG. 2. Then, the front and rear cover parts 26 and 28 are connected to each other with the main body part 12 between them to assemble a light-tight camera unit. A plurality of hooks 66 and a like number of mating holes 68, only partly shown, on the front and rear cover parts 26 and 28 engage to connect the front and rear cover parts together. Lastly, the decorative labels 42 and 44 are placed on the front and rear cover parts 26 and 28.

Figure 5:
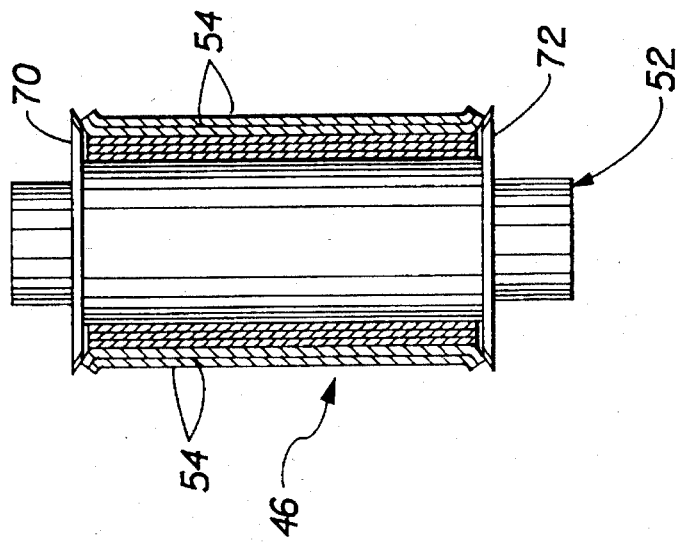
FIG. 5 is a section view of the take-up spool with the trailing end strip wound over the exposed filmstrip to light tightly shield the exposed filmstrip.

After the photographer takes a picture with the single-use camera 10, he or she manually rotates the thumbwheel 18 to wind the exposed frame onto the take-up spool 52. The rewinding movement of the filmstrip 46 the equivalent of slightly more than one frame width rotates the metering sprocket 16 in engagement with the successive film perforations 64 to decrement the frame counter 22 to its next lower-numbered setting. When the maximum number of exposures available on the filmstrip 46 are exposed and the filmstrip is completely rewound onto the take-up spool 52, the trailing end strip 54 is wound over the filmstrip as shown in FIG. 5. A pair of flanges 70 and 72 of the take-up spool 54 are spaced from each other more than the width of the filmstrip 46 but less than the width of the trailing end strip 54 to crimp the trailing end strip to light tightly shield the filmstrip. The flanges 70 and 72 are peripherally tapered inwardly to facilitate movement of the trailing end strip 54 between the flanges.

Once the single-use camera 10 is completely used, it is given to a photofinisher. The photofinisher disengages only the two hooks, not shown, and the corresponding holes 68 located at the left-hand sides of the front and rear cover parts 26 and 28, as viewed in FIG. 1, in order to fold the rear cover part back at a groove 74 and uncover the take-up chamber 62. Then, he removes the take-up spool 54 with the filmstrip 46 and the covering end strip 54 from the chamber 62, and he forwards them in tact to a film processor to develop the negatives and make prints for the customer. Lastly, he forwards the main body part 12, the front and rear cover parts 24 and 26, and the supply and take-up spools 48 and 54 to the manufacturer for recycling, i.e. remanufacture.

The invention has been described with reference to a preferred embodiment. However, it will be appreciated that variations and modifications can be effected by a person of ordinary skill in the art without departing from the scope of the invention.

PARTS LIST 10. single-use camera
12. main body part
14. taking lens
16. metering sprocket
18. film advance thumbwheel
20. shutter release button
22. frame counter
24. electronic flash unit
26. front cover part
28. rear cover part
30. front viewfinder window
32. rear viewfinder window
34. front viewfinder lens
36. rear viewfinder lens
38. lens opening
40. flash emission window
42. front label
44. rear label
46. filmstrip
48. supply spool
50. film leader
52. take-up spool
54. trailing end strip
56. spool flange
58. spool flange
60. supply chamber
62. take-up chamber
64. film perforations
66. hooks
68. mating holes
70. spool flange
72. spool flange
74. groove

I claim:

1. A single-use camera comprising a supply spool having a pair of axially spaced flanges, a take-up spool having a pair of axially spaced flanges, and a filmstrip adapted to be wound off said supply spool from between its flanges, is characterized in that:

said filmstrip includes an opaque trailing endstrip which is wider than a preceding portion of the filmstrip;

said flanges of the supply spool are spaced from each other more than the width of said trailing end strip to permit the trailing end strip to be stored on the supply spool beneath said filmstrip without being deformed by the flanges; and said flanges of the take-up spool are spaced from each other more than the width of said trailing end strip to crimp the trailing end strip to light tightly shield the filmstrip when the trailing end strip is wound onto the take-up spool over the filmstrip.

2. A single-use camera as recited in claim 1, wherein said flanges of the take-up spool are tapered inwardly to facilitate movement of said trailing end strip between the flanges.

* * * * *

UNITED STATES PATENT AND TRADEMARK OFFICE
CERTIFICATE OF CORRECTION

PATENT NO. : 5,528,326
DATED : 18 June 1996
INVENTOR(S) : Joel S. Lawther

It is certified that error appears in the above-indentified patent and that said Letters Patent is hereby corrected as shown below:

Column 4, line 59, delete "more" and insert --less--.

Delete "more" and insert --less--. --

Signed and Sealed this

Ninth Day of September, 1997

Attest:

BRUCE LEHMAN

*Attesting Officer*  *Commissioner of Patents and Trademarks*